Jan. 4, 1938.  K. FUCHS  2,104,365
STEERABLE AND REVERSIBLE TOY VEHICLE
Filed Aug. 17, 1936
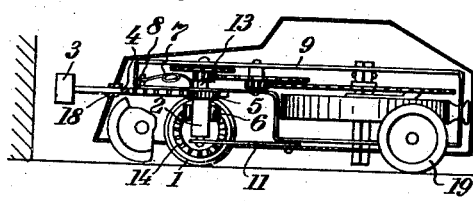
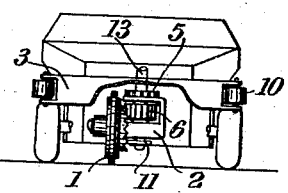
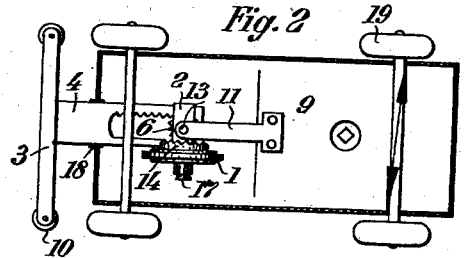
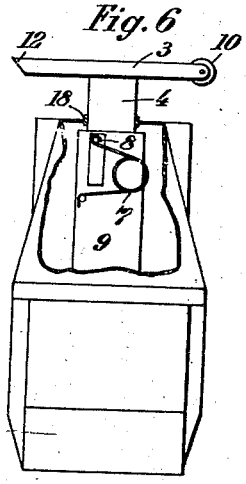
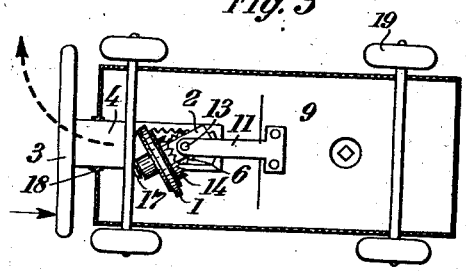
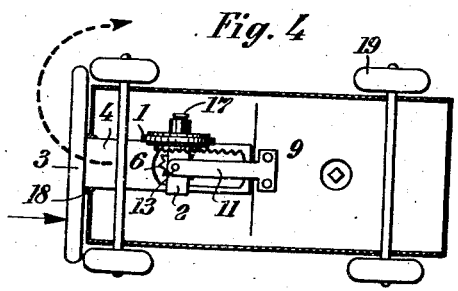
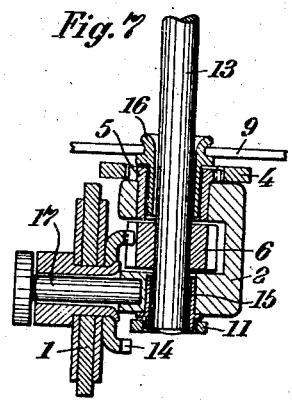
Inventor:
Karl Fuchs Patented Jan. 4, 1938

2,104,365

UNITED STATES PATENT OFFICE 2,104,365

STEERABLE AND REVERSIBLE TOY VEHICLE

Karl Fuchs, Nuremberg, Germany

Application August 17, 1936, Serial No. 96,449
In Germany August 21, 1935

4 Claims. (Cl. 46—211)

This invention relates to a reversible and steerable toy vehicle with an auxiliary driven steering or reversing wheel oscillatable about a fulcrum at a uniform distance from the driving shaft by means of a slidable rack, which wheel is turned when a bumper rigidly connected with the push rod or rack comes into contact with an obstacle, so that the vehicle is automatically steered laterally.

According to the invention, for the purpose of laterally steering the toy vehicle, the reversing or steering wheel oscillatable about a driving axle, is connected with a rack or push rod in such a manner that, when the bumper rigidly connected with the push rod comes into contact with an obstacle, for example a wall, the steering wheel is swung about the driving axle and the vehicle describes a curve corresponding to the angular displacement of the steering wheel.

An embodiment of the invention is illustrated by way of example in the accompanying drawing in which:—

Fig. 1 shows the toy vehicle, for example a motor car in side elevation, with the side wall broken away.

Fig. 2 is a bottom plan view of Fig. 1.

Fig. 3 is a similar view showing the steering wheel partly turned.

Fig. 4 is a similar view showing the steering wheel completely turned into reversing position.

Fig. 5 shows the toy in front elevation with the front wall partly broken away.

Fig. 6 is a top plan view of the toy with the top wall partly broken away to show the spring pressing forwards the rack or push rod.

Fig. 7 is a cross section on a larger scale through the steering wheels 1 with driving axle 13 and U-shaped carrier 2.

The front wheels of the toy vehicle, for example a motor car only lightly touch the track. The oscillatable steering wheel 1 is constructed as driving wheel and situated as far forward as possible.

The two rear wheels 19 are not driven and run loosely on their axle, they only serve for maintaining a state of equilibrium.

The steering or reversing wheel 1 is provided with a lateral toothed rim 14 which meshes with a pinion 6 keyed on the driving shaft 13 so that, when the driving shaft 13, which is rigidly connected with the spring motor 9, is turned, the steering or running wheel is likewise turned.

The axle 17 on which the steering wheel is rotatably mounted, is fixed in the oscillatable U-shaped carrier 2, which carries rigid bushes 15 and 16 in which the rotating driving axle 13 runs absolutely freely. The steering wheel 1 can therefore rotate freely and no friction or jamming can occur on the bearing bushes 15 and 16 for the driving axle 13. The bush 16 is fixed on the spring motor and the bush 15 is fixed in the carrier 2 and supported by a bracket 11 so that these two bushes support the oscillatable U-shaped bracket 2 so that it can easily turn about the shaft 13 and no jamming can occur.

A pinion 5 is fixed on the upper end of the oscillatable carrier 2 carrying the axle 17 on which the steering wheel is rotatably mounted and this pinion meshes with a rack formed on one wall of a slot at the inner end of a push rod 4 extending through an aperture in the front of the toy and carrying on its front end a transverse bar constructed as a bumper 3, irrespectively of whether the toy is constructed to simulate a motor car, beetle or the like.

If, when the toy is running, the bumper 3 comes into contact with an obstacle, the rack push rod 4 will be pushed towards the rear of the toy (see Figs. 2, 3, and 4). Thus, the carrier 2 with the driven steering wheel will be oscillated through the intermediary of the pinion 5 so that the toy will veer to one side or run backwards.

The rack push rod 4 is acted upon by a spring 7 or a weight which tends to return the rod into its initial position (Fig. 6). Thus, the steering or reversing wheel 1 and the carrier 2 will always revert into their initial position, so that the vehicle, after being steered or reversed, will again run straight ahead. The spring 7 is mounted on a pin 8 on the push rod 4 (Figs. 1 and 6).

In order that the bumper 3 may brush lightly against an obstacle, it has two rollers 10 mounted one at each end. The bumper 3 may, however, be provided with a sharp edge 12 (Fig. 6) at one end, to obtain quicker reversal when the toy encounters an obstacle. The sharp edge on the bumper 3 is arranged on the side of the vehicle towards which the vehicle turns.

When the vehicle is constructed to simulate a beetle, mouse or the like, a slidable or oscillatable feeler, head or the like may be provided instead of the transverse bar or bumper 3.

In order to obtain an easy reversal of the vehicle it is advisable to mount the axle carrying the rear wheels 19 slightly inclined in the turning direction of the vehicle as indicated by the arrow in Fig. 2. This presents the advantage that the toy, owing to the slightly inclined position of the rear axle, can easily turn on a very small surface.

I claim:—

1. A reversible and steerable toy, comprising in combination, a vertical driving axle, a carrier oscillatable about said axle, a horizontal axle fixed in said carrier, a steering and reversing wheel rotatable on said last-mentioned axle, a toothed rim on one side of said wheel, a toothed wheel keyed on said vertical driving axle and meshing with said toothed rim to rotate said steering and reversing wheel, a pinion fixed on said carrier, and a push rod projecting from the front of the toy and forming a rack engaging said pinion, said rod adapted to shift relatively to said carrier when said rod encounters an obstacle and rotate said pinion and turn said carrier with said steering and reversing wheel about said vertical shaft.

2. In a reversible and steerable toy as specified in claim 1 a spring tending to return the push rod into its initial position.

3. In a reversible and steerable toy as specified in claim 1 a transverse bar constructed as a buffer fixed on the front end of the push rod, a roller on one end of said transverse bar adapted to run along the obstacle encountered, and impart a gentle turning movement to the steering and reversing wheel, and a sharp edge formed on the other end of said bar adapted to engage the obstacle and impart a strong turning movement to the steering and reversing wheel, said edge being arranged on the side towards which the vehicle runs.

4. In a reversible and steerable toy as specified in claim 1 a horizontal rear axle arranged at a slight incline to the longitudinal axis of the toy in the turning direction thereof.

KARL FUCHS.